US012570850B2

(12) United States Patent
Hashiguchi et al.

(10) Patent No.: US 12,570,850 B2
(45) Date of Patent: Mar. 10, 2026

(54) POLY(3-HYDROXYBUTYRATE)-BASED RESIN TUBE AND METHOD FOR PRODUCING SAME

(71) Applicant: KANEKA CORPORATION, Osaka (JP)

(72) Inventors: Tomoaki Hashiguchi, Settsu (JP); Tetsuo Okura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 359 days.

(21) Appl. No.: 17/907,518

(22) PCT Filed: Apr. 9, 2021

(86) PCT No.: PCT/JP2021/015059
§ 371 (c)(1),
(2) Date: Sep. 27, 2022

(87) PCT Pub. No.: WO2021/210511
PCT Pub. Date: Oct. 21, 2021

(65) Prior Publication Data
US 2023/0145613 A1 May 11, 2023

(30) Foreign Application Priority Data
Apr. 17, 2020 (JP) ................................. 2020-074313

(51) Int. Cl.
*C08L 67/04* (2006.01)
*B29C 48/00* (2019.01)
(Continued)

(52) U.S. Cl.
CPC ............ *C08L 67/04* (2013.01); *B29C 48/022* (2019.02); *B29C 48/09* (2019.02);
(Continued)

(58) Field of Classification Search
CPC ........ B29C 2948/92704; B29C 48/022; B29C 48/09; B29C 48/10; B29C 48/32;
(Continued)

(56) References Cited

U.S. PATENT DOCUMENTS 3,339,004 A * 8/1967 Nardone .............. A47G 21/186
264/296
2011/0189414 A1 8/2011 Whitehouse
(Continued)

FOREIGN PATENT DOCUMENTS

JP 2005-350530 A 12/2005
JP 2006-136657 A 6/2006
(Continued)

OTHER PUBLICATIONS

International Search Report issued Jun. 1, 2021, in PCT/JP2021/015059 (with English Translation), 6 pages.
(Continued)

*Primary Examiner* — Yan Lan
(74) *Attorney, Agent, or Firm* — Oblon, McClelland, Maier & Neustadt, L.L.P.

(57) ABSTRACT

It is an object of an embodiment of the present invention to provide: a poly(3-hydroxybutyrate)-based resin tube which exhibits excellent resistance to repeated bending; and a method for producing the poly(3-hydroxybutyrate)-based resin tube. The object is attained by providing a poly(3-hydroxybutyrate)-based resin tube which contains 95 wt % to 60 wt % of a poly(3-hydroxybutyrate)-based resin and 5 wt % to 40 wt % of an aliphatic-aromatic polyester-based resin and has an elongation at yield point in a tensile test, a tensile elongation of not less than 50% in the tensile test, and a thickness of 0.01 mm to 0.6 mm.

5 Claims, 1 Drawing Sheet

(51) Int. Cl.

| | |
|---|---|
| *B29C 48/09* | (2019.01) |
| *B29C 48/88* | (2019.01) |
| *F16L 11/04* | (2006.01) |
| *B29K 67/00* | (2006.01) |
| *B29K 105/00* | (2006.01) |
| *B29L 23/00* | (2006.01) |

(52) U.S. Cl.
CPC ........ *B29C 48/9115* (2019.02); *B29C 48/919* (2019.02); *F16L 11/04* (2013.01); *B29K 2067/04* (2013.01); *B29K 2105/0088* (2013.01); *B29K 2995/006* (2013.01); *B29K 2995/0077* (2013.01); *B29L 2023/008* (2013.01)

(58) Field of Classification Search
CPC . B29C 48/9115; B29C 48/913; B29C 48/919; B29C 48/92; B29K 2067/04; B29K 2105/0088; B29K 2995/006; B29K 2995/0077; B29L 2023/008; F16L 11/04
See application file for complete search history.

(56) References Cited

U.S. PATENT DOCUMENTS

| | | | |
|---|---|---|---|
| 2011/0190430 A1 | 8/2011 | Nakamura | |
| 2016/0090466 A1* | 3/2016 | Koyama | ............... C08K 5/053 |
| | | | 524/387 |
| 2020/0384745 A1 | 12/2020 | Inagaki et al. | |
| 2021/0301127 A1* | 9/2021 | Okura | .................... C08L 67/04 |

FOREIGN PATENT DOCUMENTS

| | | | | |
|---|---|---|---|---|
| JP | 2011-208040 A | 10/2011 | | |
| JP | 2020-122131 A | 8/2020 | | |
| WO | WO 2010/013483 A1 | 2/2010 | | |
| WO | WO 2019/189367 A1 | 10/2019 | | |
| WO | WO2020/040093 A1 * | 2/2020 | ........... | A47G 21/186 |

OTHER PUBLICATIONS

Written Opinion issued Jun. 1, 2021, in PCT/JP2021/015059 (with English Translation), 8 pages.

* cited by examiner

POLY(3-HYDROXYBUTYRATE)-BASED RESIN TUBE AND METHOD FOR PRODUCING SAME

CROSS-REFERENCE TO RELATED APPLICATIONS

This application is a national stage of International Application No. PCT/JP2021/015059 filed on Apr. 9, 2021, and claims priority to Japanese Application No. 2020-074313 filed on Apr. 1, 2020, the disclosures of which are incorporated herein by reference in their entireties.

TECHNICAL FIELD

The present invention relates to a poly(3-hydroxybutyrate)-based resin tube and a method for producing the poly(3-hydroxybutyrate)-based resin tube.

BACKGROUND ART

Separation and collection of food waste and composting of food waste are increasingly becoming common in recent years, especially in Europe. Accordingly, there is a need for a plastic product that can be composted together with food waste. As an example of such a plastic product, a tubular molded product (tube), such as a straw, which contains polylactic acid as a main component has been disclosed.

However, polylactic acid is biodegradable in a compost but cannot be expected to decompose in a short period in ocean where the temperature is low. Polylactic acid thus cannot be a solution to ocean pollution.

In connection with this issue, a poly(3-hydroxybutyrate)-based resin (may hereinafter be abbreviated as "P3HB-based resin"), which is a thermoplastic polyester produced and accumulated in cells of many microbial species as an energy storage substance, is a material that can undergo biodegradation in seawater as well as in soil, and thus is drawing attention as a material that solves the issue.

For example, Patent Literature 1 discloses a tubular molded product consisting of a P3HB-based resin, an aliphatic polyester-based resin, and an inorganic filler.

CITATION LIST

Patent Literature

[Patent Literature 1]
International Publication No. WO 2019/189367

SUMMARY OF INVENTION

Technical Problem

However, the tubular molded product disclosed in Patent Literature 1 has been found to have room for improvement in resistance to repeated bending, due to containing the inorganic filler. This, for example, leads to a problem that it is difficult to process the tubular molded product to form bellows therein at room temperature.

As such, it is an object of an aspect of the present invention to provide: a P3HB-based resin tube containing a P3HB-based resin, which is a material biodegradable in seawater, and having improved characteristics; and a method for producing the P3HB-based resin tube.

Solution to Problem

As a result of diligent study for solving the foregoing issue, the inventors of the present invention completed the present invention after newly finding that, in a case where a P3HB-based resin tube, which is a material biodegradable in seawater, contains a specific resin at a specific blending ratio, it is possible to obtain a P3HB-based resin tube which can be processed at room temperature to form bellows therein and exhibits excellent resistance to repeated bending.

Thus, an aspect of the present invention is a poly(3-hydroxybutyrate)-based resin tube which contains 95 wt % to 60 wt % of a poly(3-hydroxybutyrate)-based resin and 5 wt % to 40 wt % of an aliphatic-aromatic polyester-based resin and has an elongation at yield point in a tensile test, a tensile elongation of not less than 50% in the tensile test, and a thickness of 0.01 mm to 0.6 mm.

Advantageous Effects of Invention

According to an aspect of the present invention, it is possible to provide: a P3HB-based resin tube which can be processed at room temperature to form bellows therein and exhibits excellent resistance to repeated bending; and a method for producing the P3HB-based resin tube.

DESCRIPTION OF EMBODIMENTS

Figure 1:
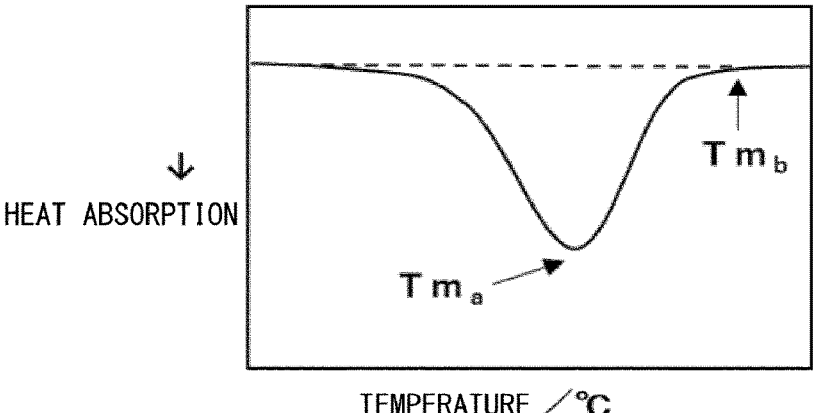
FIG. 1 is a schematic view illustrating a differential scanning calorimeter (DSC) chart of a mixture of a P3HB-based resin and an aliphatic-aromatic polyester-based resin in accordance with an embodiment of the present invention.

The following description will discuss an embodiment of the present invention in detail. Note that any numerical range expressed as "A to B" in the present specification means "not less than A and not more than B" unless otherwise stated. All literatures listed herein are incorporated herein by reference.

1. Overview of the Present Invention

A poly(3-hydroxybutyrate)-based resin tube (hereinafter referred to as "the present tube") in accordance with an embodiment of the present invention contains 95 wt % to 60 wt % of a poly(3-hydroxybutyrate)-based resin and 5 wt % to 40 wt % of an aliphatic-aromatic polyester-based resin and has an elongation at yield point in a tensile test, a tensile elongation of not less than 50% in the tensile test, and a thickness of 0.01 mm to 0.6 mm.

A P3HB-based resin generally has a characteristic that, in a case where the P3HB-based resin is plasticized by heating, it is difficult to maintain a shape of the P3HB-based resin. Thus, it is difficult for a P3HB-based resin to both maintain a shape and be shapable when heated. As such, a P3HB-based resin has poor secondary processability. In view of this issue, the inventors of the present invention previously conducted study and arrived at using a P3HB-based resin whose melting point exhibits a specific behavior, and thus successfully developed a P3HB-based resin tube which is easy to bend and suitable for use as a straw and can quickly decompose even in seawater.

However, while further conducting detailed study on P3HB-based resin tubes, the inventors of the present invention found that the above P3HB-based resin tube not only was difficult to process to form bellows therein at room temperature, but also had a new problem in terms of resistance to repeated bending.

Then, as a result of diligent study on P3HB-based resin tubes, the inventors of the present invention newly found that, in a case where a P3HB-based resin and an aliphatic-aromatic polyester-based resin at a specific blending ratio, it is possible to (1) obtain a P3HB-based resin tube which can be processed at room temperature to form bellows therein and exhibits excellent resistance to repeated bending and (2) a film formed from resin pellets containing a mixture of a P3HB-based resin and an aliphatic-aromatic polyester-based resin has an elongation at yield point and also a high tensile elongation.

There has never been disclosed a P3HB-based resin tube that has the above-described characteristics. The present invention is extremely useful for use in various fields.

2. Poly(3-Hydroxybutyrate)-Based Resin Tube (Poly(3-Hydroxybutyrate)-Based Resin Tube)

The present tube contains a poly(3-hydroxybutyrate)-based resin.

In the present specification, a P3HB-based resin is an aliphatic polyester resin which contains 3-hydroxybutyrate as a repeating unit and can be produced from a microorganism.

In an embodiment of the present invention, the P3HB-based resin can be poly(3-hydroxybutyrate) in which 3-hydroxybutyrate is the only repeating unit or can be a copolymer of 3-hydroxybutyrate and another hydroxyalkanoate.

In an embodiment of the present invention, the P3HB-based resin can be a mixture of a homopolymer and two or more types of copolymer or can be a mixture of two or more types of copolymer. The form of copolymerization is not particularly limited, and can be random copolymerization, alternating copolymerization, block copolymerization, graft copolymerization, or the like.

In an embodiment of the present invention, examples of the P3HB-based resin include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly(3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these examples, P3HB, P3HB3HH, P3HB3HV, and P3HB4HB are preferable for being easily produced on an industrial scale.

Further, P3HB3HH, which is a copolymer of 3-hydroxybutyric acid and 3-hydroxyhexanoic acid, is more preferable from the following viewpoints: (i) by changing a composition ratio of repeating units, it is possible to cause a change in melting point and crystallinity and consequently in physical properties, such as Young's modulus and heat resistance, of P3HB3HH and to enable P3HB3HH to have physical properties between the physical properties of polypropylene and the physical properties of polyethylene; and (ii) P3HB3HH is a resin that is easily produced on an industrial scale as described above and has useful physical properties. In particular, among P3HB-based resins having the characteristic of easily undergoing pyrolysis under heat of not lower than 180° C., P3HB3HH is preferable from the viewpoint of having a low melting point and enabling molding at low temperatures.

Note that P3HB3HV, though having a melting point, a Young's modulus, and the like varying in accordance with a ratio of a 3-hydroxybutyrate component and a hydroxyvalerate component, has a crystallinity as high as not less than 50% because of cocrystallization of the 3-hydroxybutyrate component and the hydroxyvalerate component. As such, P3HB3HV has a higher plasticity than P3HB but has room for improvement in brittleness.

The P3HB-based resin can be produced, for example, by a microorganism. The microorganism that produces the P3HB-based resin is not limited to a particular one, provided that the microorganism is capable of producing the P3HB-based resin. For example, the first P3HB-producing bacteria discovered was *Bacillus megaterium* (discovered in 1925), and other examples of a P3HB-producing bacteria include natural microorganisms such as *Cupriavidus necator* (previously classified as *Alcaligenes eutrophus*), *Ralstonia eutropha*, and *Alcaligenes latus*. These microorganisms are known to accumulate P3HB within bacterial cells of the microorganisms.

Known bacteria that produce a copolymer of hydroxybutyrate and another hydroxyalkanoate include *Aeromonas caviae*, which is a bacterium capable of producing P3HB3HV and P3HB3HH, and *Alcaligenes eutrophus*, which is a bacterium capable of producing P3HB4HB. Particularly with respect to P3HB3HH, *Alcaligenes eutrophus* AC32, FERM P-6038 (T. Fukui, Y. Doi, J. Bateriol., 179, p. 4821-4830 (1997)), into which genes of P3HA synthetases have been introduced in order to increase P3HB3HH productivity, is more preferable. Bacterial cells of these microorganisms which have been cultured under appropriate conditions to accumulate P3HB3HH in the bacterial cells are used. Apart from the above, depending on the P3HB-based resins to be produced, genetically modified microorganisms into which various genes associated with synthesis of the P3HB-based resins have been introduced can be used, and culture conditions including substrate type can be optimized.

P3HB3HH can also be produced by, for example, a method disclosed in International Publication No. WO 2010/013483. Examples of commercially available P3HB3HH include "KANEKA Biodegradable Polymer PHBH (Registered trademark)" (for example, X131A and 151C used in Examples) by KANEKA CORPORATION.

In an embodiment of the present invention, a composition ratio of repeating units in P3HB3HH is such that a composition ratio of a 3-hydroxybutyrate unit to a 3-hydroxyhexanoate unit is preferably 80/20 (mol/mol) to 99/1 (mol/mol) and more preferably 85/15 (mol/mol) to 97/3 (mol/mol) from the viewpoint of a balance between plasticity and strength. In a case where the composition ratio of the 3-hydroxybutyrate unit to the 3-hydroxyhexanoate unit is not more than 99/1 (mol/mol), a sufficient plasticity is obtained, and in a case where the composition ratio is not less than 80/20 (mol/mol), a sufficient hardness is obtained.

In an embodiment of the present invention, a weight average molecular weight (may hereinafter be referred to as "Mw") of the P3HB-based resin is not particularly limited, but is preferably 150,000 to 800,000, more preferably 200,000 to 700,000, and even more preferably 250,000 to 600,000. In a case where the weight average molecular weight is not less than 150,000, sufficient mechanical properties are obtained. In a case where the weight average molecular weight is not more than 800,000, sufficient crystallization speed is obtained and good molding processability is achieved. The weight average molecular weight of the P3HB-based resin can be determined as a molecular weight in terms of polystyrene as measured by gel permeation chromatography (GPC) ("Shodex GPC-101" manufactured by Showa Denko K.K.) in which a polystyrene gel ("Shodex K-804" manufactured by Showa Denko K.K.) is used in a column and chloroform is used as a mobile phase.

In an embodiment of the present invention, the P3HB-based resin is preferably a mixture of two or more polymers differing in physical property, from the viewpoint of a balance between plasticity and strength, and molding processability. In a preferable embodiment of the present invention, the P3HB-based resin is a mixture of two or more polymers differing in crystallinity. Use of the two or more polymers differing in crystallinity, in particular, tends to increase a difference in melting point (described later) of the resin mixture, so that molding is facilitated.

A mixing ratio of the two or more polymers differing in crystallinity in the mixture is not particularly limited, and can be set as appropriate in accordance with the types of the polymers mixed and the like. In a mixture of two polymers, one of the two polymers which one has the higher crystallinity is preferably contained in an amount of not less than 50% by weight relative to 100% by weight of the mixture, from the viewpoint of molding processability. In a mixture of three or more polymers, one of the three or more polymers which one has the highest crystallinity is preferably contained in an amount of not less than 50% by weight, from the viewpoint of molding processability. For example, it is preferable that a polymer which contains 3HB and 3HH at a molar ratio of 99/1 to 93/7 and thus has high crystallinity be contained in an amount of not less than 50% by weight.

In a preferable example of mixing two or more polymers differing in physical property, the P3HB-based resin is a mixture of KANEKA Biodegradable Polymer PHBH (Registered trademark) X131A, which is a P3HB-based resin having high crystallinity, and KANEKA Biodegradable Polymer PHBH (Registered trademark) 151C, which is a P3HB-based resin having low crystallinity. A mixing ratio of these resins is not particularly limited, and can be set as appropriate in accordance with the types of the resins mixed and the like. From the viewpoint of molding processability, a weight ratio of X131A is preferably higher than that of 151 C. Note that X131A has a 3HB/3HH molar ratio of 94/6, an MFR of 3 g/10 min (160° C.-5 kgf), and a melting point of 144° C. 151C has a 3HB/3HH molar ratio of 89/11, an MFR of 3 g/10 min (160° C.-5 kgf), and a melting point of 125° C.

(Aliphatic-Aromatic Polyester-Based Resin)

The present tube contains an aliphatic-aromatic polyester-based resin. In the present specification, an "aliphatic-aromatic polyester-based resin" is a polyester polymer which includes a repeating unit derived from an aliphatic dicarboxylic acid, a repeating unit derived from an aromatic dicarboxylic acid, and a repeating unit derived from a diol.

Examples of the aliphatic dicarboxylic acid which can be a component of the aliphatic-aromatic polyester-based resin include succinic acid, adipic acid, azelaic acid, sebacic acid, brassylic acid, pimelic acid, suberic acid, fumaric acid, and itaconic acid. These aliphatic dicarboxylic acids can be used alone, or two or more of these aliphatic dicarboxylic acids can be used in combination. In particular, adipic acid, azelaic acid, sebacic acid, and succinic acid are preferable.

Examples of the aromatic dicarboxylic acid which can be a component of the aliphatic-aromatic polyester-based resin include terephthalic acid, isophthalic acid, and frandicarboxylic acid. These aromatic dicarboxylic acids can be used alone, or two or more of these aromatic dicarboxylic acids can be used in combination. In particular, terephthalic acid and frandicarboxylic acid are preferable.

Examples of the diol which can be a component of the aliphatic-aromatic polyester-based resin include 1,2-ethanediol, 1,3-propanediol, and 1,4-butanediol. These diols can be used alone, or two or more of these diols can be used in combination. In particular, 1,4-butanediol is preferable.

In an embodiment of the present invention, specific examples of the aliphatic-aromatic polyester-based resin include polybutylene succinate terephthalate (PBST), polybutylene adipate terephthalate (PBAT), polybutylene sebacate terephthalate (PBSeT), and polybutylene azelate terephthalate (PBAzT). In particular, from the viewpoint(s) of industrial availability, heat resistance, degradability in ocean, and/or the like, polybutylene adipate terephthalate (PBAT), polybutylene sebacate terephthalate (PBSeT), and polybutylene azelate terephthalate (PBAzT) are particularly preferable.

In an embodiment of the present invention, the aliphatic-aromatic polyester-based resin can be a commercially available one. For example, an aliphatic-aromatic polyester-based resin manufactured by BASF, Ecoflex (Registered trademark) F Blend C1200, and the like can be used.

In an embodiment of the present invention, a composition ratio of repeating units in the aliphatic-aromatic polyester-based resin is such that a composition ratio of an aliphatic dicarboxylic acid unit to an aromatic dicarboxylic acid unit is preferably 95/5 (mol/mol) to 30/70 (mol/mol) and more preferably 90/10 (mol/mol) to 40/60 (mol/mol) from the viewpoint of mechanical characteristics. In a case where the aromatic dicarboxylic acid unit is contained in an amount of not less than 5 mol % relative to 100 mol % of a total of the aliphatic dicarboxylic acid unit and the aromatic dicarboxylic acid unit, good mechanical characteristics are achieved. In a case where the aromatic dicarboxylic acid unit is contained in an amount of not more than 70 mol %, excellent biodegradability is achieved.

In an embodiment of the present invention, a weight average molecular weight of the aliphatic-aromatic polyester-based resin is not particularly limited, but is preferably 10,000 to 500,000, and more preferably 20,000 to 400,000. In a case where the weight average molecular weight is not more than 500,000, processing is facilitated. In a case where the weight average molecular weight is not less than 10,000, excellent physical properties are achieved. A weight average molecular weight of the aliphatic-aromatic polyester-based resin can be determined by a method similar to the method of determining a weight average molecular weight of the P3HB-based resin.

(Poly(3-Hydroxybutyrate)-Based Resin Tube)

The present tube contains the poly(3-hydroxybutyrate)-based resin and the aliphatic-aromatic polyester-based resin at a specific blending ratio and has a thickness of not less than 0.01 mm and not more than 0.6 mm.

In the present specification, a "tube" means a hollow elongated cylindrical molded product having a substantially constant thickness and constituted by a wall surface having a substantially circular cross section.

The thickness of the present tube is not particularly limited, but is within a range of not less than 0.01 mm in order to prevent the present tube from being crushed by sucking when the present tube is used as a straw to drink a beverage. Further, also in order to maintain sufficient strength to withstand water pressure in a step of solidifying the resin underwater in molding a tube by melt extrusion as described later, the thickness of the present tube is preferably not less than 0.05 mm, more preferably not less than 0.1 mm, and even more preferably not less than 0.12 mm.

Further, the thickness of the present tube is in a range of not more than 0.6 mm, more preferably not more than 0.4 mm, in order for the present tube to (i) be moderately flexible and thus less prone to breaking and less likely to harm a finger poked by the present tube and (ii) be easily biodegraded even in seawater.

In an embodiment of the present invention, a blending ratio of the P3HB-based resin and the aliphatic-aromatic polyester-based resin in the present tube is, for example, such a ratio that 95% by weight to 60% by weight of the P3HB-based resin and 5% by weight to 40% by weight of the aliphatic-aromatic polyester-based resin are contained, preferably such a ratio that 94% by weight to 62% by weight of the P3HB-based resin and 6% by weight to 38% by weight of the aliphatic-aromatic polyester-based resin are contained, more preferably such a ratio that 93% by weight to 65% by weight of the P3HB-based resin and 7% by weight to 35% by weight of the aliphatic-aromatic polyester-based resin are contained, and even more preferably such a ratio that 92% by weight to 67% by weight of the P3HB-based resin and 8% by weight to 33% by weight of the aliphatic-aromatic polyester-based resin are contained. In a case where the blending ratio of the P3HB-based resin and the aliphatic-aromatic polyester-based resin is within any of the above ranges, the present tube can be processed at room temperature to form bellows therein and also exhibits excellent resistance to repeated bending. Note that the resistance to repeated bending of the present tube is measured and evaluated by a method described in the Examples.

In an embodiment of the present invention, the present tube contains a mixture of the poly(3-hydroxybutyrate)-based resin and the aliphatic-aromatic polyester-based resin, a crystal melting curve of the mixture in differential scanning calorimetry being such that a difference (may hereinafter be referred to as a "difference in melting point") between a top temperature $(Tm_a)$ of the crystal melting curve within a range of 130° C. to 155° C. and an end temperature $(Tm_b)$ of the crystal melting curve is not less than 10° C. In a case where the mixture is contained, molding is facilitated.

In an embodiment of the present invention, the difference in melting point is not less than 10° C., preferably not less than 12° C., more preferably not less than 15° C., and even more preferably not less than 17° C. In a case where the difference in melting point is within any of the above ranges, it is easy to melt the P3HB-based resin and the aliphatic-aromatic polyester-based resin while leaving part of the crystals unmelted. This allows a shape of the tube as a whole to be maintained while a predetermined portion of the tube is plasticized by heating in secondary processing of the tube. Thus, shaping of the tube by secondary processing can be easily achieved. That is, it is possible for the tube to both maintain a shape of the tube and be shapable when heated, so that excellent secondary processability is achieved. As a result, a bent portion and a stretchable structure can be easily formed in a straw, and thus a highly convenient straw can be provided. Further, the characteristic of having excellent resistance to repeated bending can be imparted to the tube.

Further, in addition to the above-described excellent secondary processability, there is also an advantage that, in molding a tube by melt extrusion as described later, the P3HB-based resin and the aliphatic-aromatic polyester-based resin solidify underwater more quickly after the extrusion, so that flattening of the tube by water pressure is better prevented.

There is no particular limitation to an upper limit, but from the viewpoint of easy production of the mixture of the P3HB-based resin and the aliphatic-aromatic polyester-based resin, the upper limit is, for example, not more than 50° C., more preferably not more than 40° C., even more preferably not more than 35° C., and particularly preferably not more than 30° C.

Figure 2:
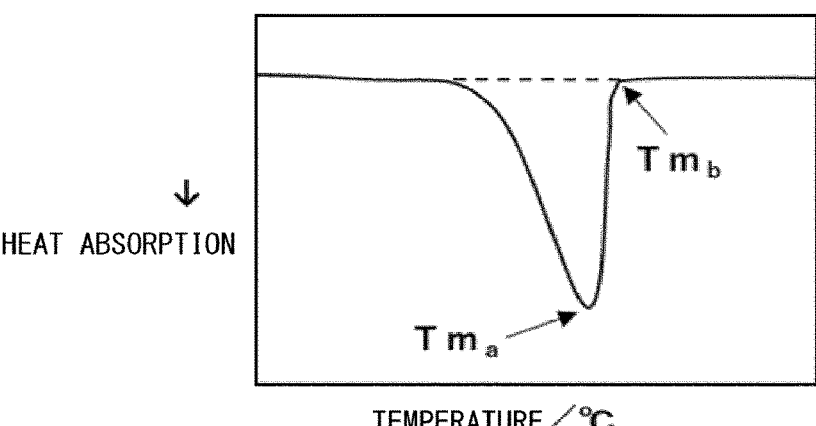
FIG. 2 is a schematic view illustrating a DSC chart of a mixture of a P3HB-based resin and an aliphatic-aromatic polyester-based resin other than preferable embodiments of the present invention.
Figure 3:
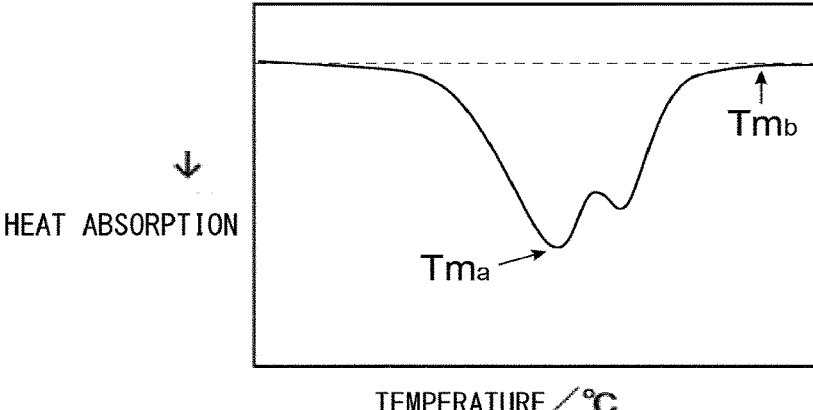
FIG. 3 is a schematic view illustrating a differential scanning calorimeter (DSC) chart of a mixture of a P3HB-based resin and an aliphatic-aromatic polyester-based resin in accordance with an embodiment of the present invention.

In the present specification, a "top temperature $(Tm_a)$ of a crystal melting curve in differential scanning calorimetry" and an "end temperature $(Tm_b)$ of a crystal melting curve" are defined as follows. An aluminum pan is filled with 4 mg to 10 mg of a resin sample, and the resin sample is heated from 30° C. to 180° C. at a rate of 10° C./min under flow of a nitrogen gas stream with use of a differential scanning calorimeter to melt the resin sample and obtain an endothermic curve. With respect to a melting point peak(s) within a range of 130° C. to 155° C. on the obtained endothermic curve, a top temperature of a melting point peak at which an amount of heat absorption is maximized is regarded as $Tm_a$, and a temperature at which heat absorption is no longer observed is regarded as $Tm_b$. In a case where another melting point peak exists on a higher temperature side with respect to $Tm_a$, a temperature at which heat absorption related to the another melting point peak is no longer observed is regarded as $Tm_b$. For example, "a top temperature $(Tm_a)$ of a crystal melting curve in differential scanning calorimetry" and "an end temperature $(Tm_b)$ of the crystal melting curve" indicate respective positions illustrated in each of FIGS. 1 through 3. Specifically, FIG. 1 schematically illustrates a DSC chart in which $Tm_a$ is in a range of 130° C. to 155° C. and a difference between $Tm_b$ and $Tm_a$ is not less than 10° C. FIG. 2 schematically illustrates a DSC chart in which $Tm_a$ is in a range of 130° C. to 155° C. but a difference between $Tm_b$ and $Tm_a$ is less than 10° C. FIG. 3 schematically illustrates a DSC chart in which $Tm_a$ is in a range of 130° C. to 155° C., another melting point peak exists on a higher temperature side with respect to $Tm_a$, and a difference between $Tm_b$ and $Tm_a$ is not less than 10° C.

In an embodiment of the present invention, $Tm_a$ and $Tm_b$ of the mixture of the P3HB-based resin and the aliphatic-aromatic polyester-based resin are such that, for example, (i) $Tm_b$=160° C. to 180° C. with respect to $Tm_a$=130° C. to 155° C. and (ii) more preferably $Tm_b$=165° C. to 175° C. with respect to $Tm_a$=140° C. to 145° C. In a case where a melting point of the mixture of the P3HB-based resin and the aliphatic-aromatic polyester-based resin is within any of the above ranges, (i) processing in which part of the crystals is left while the resins are sufficiently melted can be easily carried out in a temperature range below 180° C., which is a thermal decomposition temperature of the mixture of the P3HB-based resin and the aliphatic-aromatic polyester-based resin, so that excellent secondary processability is achieved, and (ii) the characteristic of having excellent resistance to repeated bending can be imparted to the mixture.

Note that in differential scanning calorimetry, a difference between a top temperature $(Tm_a)$ of a crystal melting curve within a range of 130° C. to 155° C. and an end temperature $(Tm_b)$ of the crystal melting curve is measured by a method described later in the Examples.

In an embodiment of the present invention, the mixture of the P3HB-based resin and the aliphatic-aromatic polyester-based resin satisfying the difference in melting point can be, for example, a mixture of any of the foregoing commercially available P3HB-based resins and any of the foregoing commercially available aliphatic-aromatic polyester-based resins. The P3HB-based resin can be, for example, "KANEKA Biodegradable Polymer PHBH (Registered trademark)" (for example, X131A and 151C used in the Examples) by KANEKA CORPORATION, or the like. The aliphatic-aromatic polyester-based resin can be, for example, an aliphatic-aromatic polyester-based resin manufactured by BASF, Ecoflex (Registered trademark) F Blend C1200, or the like.

In an embodiment of the present invention, in the present tube, a single P3HB-based resin can be used alone, or two or more P3HB-based resins can be used in combination. In a case where two or more P3HB-based resins are used in combination, for example, any ones of the resins described earlier under (Poly(3-hydroxybutyrate)-based resin tube) are used.

In an embodiment of the present invention, the present tube can contain one or more biodegradable resins other than the poly(3-hydroxybutyrate)-based resin and the aliphatic-aromatic polyester-based resin, provided that effects of the present invention are exhibited. Examples of such other resin(s) include aliphatic polyester-based resins such as polybutylene succinate adipate, polybutylene succinate, polycaprolactone, and polylactic acid. An amount of these resins added is not particularly limited, but is preferably not more than 30 parts by weight and more preferably not more than 20 parts by weight, relative to 100 parts by weight of the P3HB-based resin. A lower limit is not particularly limited, and can be 0 part by weight.

Further, the present tube can contain an additive typically used in the technical field, provided that effects of the present invention are exhibited. Examples of the additive include: coloring agents such as pigments and colorants; deodorizing agents such as activated carbon and zeolite; perfumes such as vanillin and dextrin; plasticizers; antioxidants; antioxidants; weather resistance improving agents; ultraviolet ray absorbing agents; crystal nucleating agents; lubricants; water repellent agents; antibacterial agents; and slidability improving agents. In particular, adding a crystal nucleating agent enables a significant improvement in processability. Examples of the crystal nucleating agent include pentaerythritol. These additives can be contained alone, or two or more of these additives can be contained in combination. A content of each of these additives can be set as appropriate by a person skilled in the art according to the purpose of using the present tube.

In the present invention, it was found that, in a case where an inorganic filler is added to the mixture of the P3HB-based resin and the aliphatic-aromatic polyester-based resin, a resultant tube is highly rigid, does not exhibit an elongation at yield point, and has a reduced tensile elongation. Such a tube has poor bellows moldability and poor resistance to repeated bending. It is thus preferable that the present tube contain substantially no inorganic filler. More specifically, the present tube has an inorganic filler content of preferably less than 5% by weight, more preferably less than 3% by weight, and even more preferably less than 1% by weight. Specific examples of the inorganic filler include talc, calcium carbonate, mica, silica, titanium oxide, alumina, zeolite, and clay.

The present tube has an elongation at yield point. Since the present tube has an elongation at yield point, the tube exhibits excellent resistance to repeated bending.

In the present specification, "an elongation at yield point" means a state in which the tube further stretches beyond a yield point in a tensile test. Note that the elongation at yield point of the present tube is measured and evaluated by a tensile test described in the Examples.

The tensile elongation of the present tube is not less than 50%, preferably not less than 55%, more preferably not less than 75%, and even more preferably not less than 100%. In a case where the tensile elongation of the present tube is not less than 50%, the tube has excellent bellows moldability. An upper limit of the tensile elongation of the present tube is not particularly limited, provided that effects of the present invention are exhibited. For example, the upper limit is 500%. Note that the tensile elongation of the present tube is measured by the tensile test described in the Examples.

An outer diameter of the present tube is not particularly limited, but is preferably 2 mm to 10 mm, more preferably 4 mm to 8 mm, and even more preferably 5 mm to 7 mm, from the viewpoint of usability of the present tube when the present tube is used as a straw to drink a beverage.

A cross sectional shape of the present tube is substantially circular, and is preferably as close to a perfect circle as possible from the viewpoint of usability as a straw. As such, a degree of flattening [$100\times\{$(maximum value of outer diameter)$-$(minimum value of outer diameter)$\}/$(maximum value of outer diameter)] of the cross sectional shape of the present tube is preferably not more than 10%, more preferably not more than 8%, even more preferably not more than 5%, and particularly preferably not more than 3%. Note that "a degree of flattening is 0%" means that the cross sectional shape is a perfect circle.

A length of the present tube is not particularly limited, but is preferably 50 mm to 350 mm, more preferably 70 mm to 300 mm, and even more preferably 90 mm to 270 mm, from the viewpoint of usability of the present tube when the present tube is used as a straw to drink a beverage.

The present tube can be suitably used as a straw. The present tube used as a straw can be a tube which has not been subjected to secondary processing, and can be a tube which has been subjected to secondary processing such as formation of a stopper part, formation of a bellows part, and the like.

3. Production Method

A method (hereinafter referred to as "the present method for producing a tube") for producing a poly(3-hydroxybutyrate)-based resin tube in accordance with an embodiment of the present invention is a method for producing the poly(3-hydroxybutyrate)-based resin tube described earlier under (Poly(3-hydroxybutyrate)-based resin tube), and includes a step of melting a mixture of the poly(3-hydroxybutyrate)-based resin and the aliphatic-aromatic polyester-based resin in an extruder and then extruding the mixture through an annular die into water, the annular die being set to a temperature between the above-described $Tm_a$ and $Tm_b$.

Generally, a P3HB-based resin has an extremely low crystallization speed in comparison with other crystalline resins such as polypropylene. As such, a P3HB-based resin tube tends to suffer more flattening (in other words, the degree of flattening tends to increase) by cooling and solidification underwater due to water pressure. In particular, a P3HB-based resin tube having a greater outer diameter and a smaller thickness tends to suffer more significant flattening by water pressure. As such, it has been difficult to produce a thin tube containing a P3HB-based resin and having a cross sectional shape close to a perfect circle.

In order to facilitate molding of a thin tube that is less prone to flattening, the present method for producing a tube is preferably arranged such that a temperature of the annular die is set to a temperature between a top temperature ($Tm_a$) of a crystal melting curve of the mixture of the P3HB-based resin and the aliphatic-aromatic polyester-based resin within a range of 130° C. to 155° C. in differential scanning calorimetry and an end temperature ($Tm_b$) of the crystal melting curve. Employing this condition allows melting a P3HB-based resin formed from the mixture of the foregoing P3HB-based resin and the aliphatic-aromatic polyester-based resin to such a level that the P3HB-based resin can be molded, while leaving part of the crystals unmelted in the molten resin. Accordingly, crystallization and solidification can quickly progress underwater after the extrusion, so that flattening of a tube due to water pressure can be reduced.

Further, in the present method for producing a tube, the P3HB-based resin is preferably a P3HB-based resin that exhibits a melt viscosity of not less than 10,000 poise at 160° C. Use of the P3HB-based resin having a high melt viscosity makes it possible to reduce an effect of water pressure during solidification underwater and thus further reduce underwater flattening of the tube. The melt viscosity is more preferably not less than 11,000 poise, even more preferably not less than 12,000 poise, and particularly preferably not less than 13,000 poise. An upper limit of the melt viscosity is not particularly limited, but is preferably not more than 30,000 poise from the viewpoints of surface smoothness of the tube and prevention of increase in pressure of the annular die. Note that the melt viscosity is a value measured with respect to a whole of the P3HB-based resin (in a case where the tube contains an additive(s), a whole of the resin including the additive(s)) contained in the P3HB-based resin tube.

In an embodiment of the present invention, the present production method is a method for producing a poly(3-hydroxybutyrate)-based resin tube in accordance with an embodiment of the present invention is a method for producing the poly(3-hydroxybutyrate)-based resin tube described earlier under (Poly(3-hydroxybutyrate)-based resin tube), and includes a step of shaping the poly(3-hydroxybutyrate)-based resin tube at room temperature. The present tube can be processed at room temperature to form bellows therein and exhibits excellent resistance to repeated bending. As such, according to the present embodiment, it is possible to easily obtain a molded product which has been processed into a desired shape.

The present invention is not limited to the embodiments, but can be altered by a skilled person in the art within the scope of the claims. The present invention also encompasses, in its technical scope, any embodiment derived by combining technical means disclosed in differing embodiments.

<1> A poly(3-hydroxybutyrate)-based resin tube, containing:

95 wt % to 60 wt % of a poly(3-hydroxybutyrate)-based resin; and 5 wt % to 40 wt % of an aliphatic-aromatic polyester-based resin, the poly(3-hydroxybutyrate)-based resin tube having an elongation at yield point in a tensile test and a tensile elongation of not less than 50% in the tensile test, the poly(3-hydroxybutyrate)-based resin tube having a thickness of 0.01 mm to 0.6 mm.

<2> The poly(3-hydroxybutyrate)-based resin tube as set forth in <1>, wherein:

the aliphatic-aromatic polyester-based resin includes a structural unit derived from an aliphatic dicarboxylic acid, a structural unit derived from an aromatic dicarboxylic acid, and a structural unit derived from a diol;

the aliphatic dicarboxylic acid is at least one selected from the group consisting of succinic acid, adipic acid, azelaic acid, sebacic acid, brassylic acid, pimelic acid, suberic acid, fumaric acid, and itaconic acid;

the aromatic dicarboxylic acid is at least one selected from the group consisting of terephthalic acid, isophthalic acid, and frandicarboxylic acid; and the diol is at least one selected from the group consisting of 1,2-ethanediol, 1,3-propanediol, and 1,4-butanediol.

<3> The poly(3-hydroxybutyrate)-based resin tube as set forth in <1> or <2>, wherein a crystal melting curve of a mixture of the poly(3-hydroxybutyrate)-based resin and the aliphatic-aromatic polyester-based resin in differential scanning calorimetry is such that a difference between a top temperature ($Tm_a$) of the crystal melting curve within a range of 130° C. to 155° C. and an end temperature ($Tm_b$) of the crystal melting curve is not less than 10° C.

<4> The poly(3-hydroxybutyrate)-based resin tube as set forth in any one of <1> through <3>, wherein the poly(3-hydroxybutyrate)-based resin is poly(3-hydroxybutyrate-co-3-hydroxyhexanoate).

<5> A method for producing a poly(3-hydroxybutyrate)-based resin tube recited in any one of claims 1 through 4, including the step of:

melting a mixture of the poly(3-hydroxybutyrate)-based resin and the aliphatic-aromatic polyester-based resin in an extruder and then extruding the mixture through an annular die into water, the annular die having a temperature set between $Tm_a$ and $Tm_b$.

<6> A method for producing a poly(3-hydroxybutyrate)-based resin tube recited in any one of claims 1 through 4, including the step of:

shaping the poly(3-hydroxybutyrate)-based resin tube at room temperature.

EXAMPLES

The following description will discuss embodiments of the present invention in further detail on the basis of Examples. However, the present invention is not limited by the Examples.

[Materials]

The following materials were used in Examples and Comparative Examples.

Resin raw material 1: KANEKA Biodegradable Polymer PHBH (Registered trademark) X131A manufactured by KANEKA CORPORATION [poly(3-hydroxybutyrate-co-3-hydroxyhexanoate)]

Resin raw material 2: KANEKA Biodegradable Polymer PHBH (Registered trademark) 151C manufactured by KANEKA CORPORATION [poly(3-hydroxybutyrate-co-3-hydroxyhexanoate)]

Resin raw material 3: Ecoflex (Registered trademark) F Blend C1200 manufactured by BASF [aliphatic-aromatic polyester-based resin (polybutylene adipate terephthalate)]

Resin raw material 4: Ecoflex (Registered trademark) FS Blend C2200 manufactured by BASF [aliphatic-aromatic polyester-based resin (polybutylene sebacate terephthalate)]

[Measuring Method and Evaluating Method]

In Examples and Comparative Examples, evaluation was carried out by the following methods.

(Evaluation by Differential Scanning Calorimetry)

An aluminum pan was filled with 4 mg to 10 mg of a resin sample (resin pellets), and the resin sample was heated from 30° C. to 180° C. at a rate of 10° C./min under flow of a nitrogen gas stream with use of a differential scanning calorimeter to obtain an endothermic curve, which was obtained when the resin sample melted. With respect to a melting point peak(s) within a range of 130° C. to 155° C., a top temperature of a melting point peak at which an amount of heat absorption was maximized was regarded as $Tm_a$, and a temperature at which heat absorption was no longer observed was regarded as $Tm_b$. In a case where another melting point peak existed on a higher temperature side with respect to $Tm_a$, a temperature at which heat absorption related to the another melting point peak was no longer observed was referred to as $Tm_b$.

(Tensile Test: Elongation at Yield Point and Tensile Elongation)

2 g of a resin sample (resin pellets) and 120-μm SUS spacers were sandwiched between PETs which had been treated to have a releasing property, and were pressed with a pressure of 4 MPa using a pressing machine heated to 170° C. Thus prepared was a film of approximately 100 μm. The prepared film was subjected to a tensile test using a tensile tester (EZ-LX 1 kN, manufactured by Shimadzu Corporation) at a tensile speed of 100 mm/min in accordance with JIS K 7127. On the basis of an S-S curve obtained by the tensile test, evaluation of elongation at yield point and calculation of tensile elongation were carried out. In the evaluation of elongation at yield point, a case in which the film further stretched beyond a yield point was evaluated as "good".

(Resistance to Repeated Bending)

Evaluation of resistance to repeated bending was carried out by repeating an operation of manually bending a resin tube by 120 degrees until the resin tube broke or cracked. The evaluation was carried out in an environment with a room temperature of 25° C. and a humidity of 60%. In a case where the resin tube did not break or crack after the bending operation was carried out 100 times or more, the resin tube was evaluated as having a "good" resistance to repeated bending.

(Bellows Forming Processing)

A bellows forming machine was used to form bellows in a resin tube at room temperature. The resin tube which was successfully processed to form bellows therein was evaluated as having a "good" bellows moldability.

(Tube Molding)

In a case where a produced tube had a degree of flattening of not more than 10%, the tube was evaluated as having a "good" tube moldability. The degree of flattening (%) is calculated by the following formula:

$$100 \times \{(\text{maximum value of outer diameter}) - (\text{minimum value of outer diameter})\}/(\text{maximum value of outer diameter})$$

[Production of Resin Pellets]

The resin raw materials 1 through 3 were mixed at a blending ratio indicated in Table 1. Then, 1 part by weight of pentaerythritol was added as a crystal nucleating agent to 100 parts by weight (the total) of the resin raw materials and then the pentaerythritol and the resin raw materials were dry blended. A resultant resin material (resin mixture) was introduced into a co-rotating twin-screw extruder having a diameter of 26 mm, a cylinder temperature adjusted to 150° C., and a die temperature adjusted to 150° C., and then the resin material was extruded. The resin material thus extruded was caused to pass through a water tank filled with hot water having a temperature of 40° C., so that strands were solidified. The strands thus solidified were cut with a pelletizer to obtain resin pellets.

Example 1

A cylinder temperature and a die temperature of a single-screw extruder, which had a diameter of 50 mm and to which an annular die (outer diameter: 15 mm, inner diameter: 13.5 mm) was connected, were each set to 150° C. Resin pellets were introduced into the single-screw extruder and were extruded into a tubular shape. The resin pellets thus extruded were caused to pass through a water tank which had a temperature of 30° C. and was spaced apart from the annular die by 50 mm. Thus obtained was a resin tube having an outer diameter of 6 mm and a thickness of 0.13 mm. The evaluation results are shown in Table 1.

Examples 2 Through 9

A resin tube having an outer diameter of 6 mm and a thickness of 0.2 mm was obtained in a similar manner to Example 1, except that a blending ratio of resin pellets was changed as indicated in Table 1. The evaluation results are shown in Table 1.

Comparative Examples 1 Through 3

A resin tube having an outer diameter of 6 mm and a thickness of 0.2 mm was obtained in a similar manner to Example 1, except that a blending ratio of resin pellets was changed as indicated in Table 1. The evaluation results are shown in Table 1.

TABLE 1

| | Blending ratio | | | | Top temperature of crystal melting curve within range of 130-155° C. (Tma)/° C. | End temperature of crystal melting curve (Tma)/° C. | | | | | |
|---|---|---|---|---|---|---|---|---|---|---|---|
| | Poly(3-hydroxybutyrate)-based resin | | Aliphatic-aromatic polyester-based resin | | | | | | | | Resistance to repeated bending |
| | X131A | 151C | Ecoflex C1200 | Ecoflex C2200 | | | Elongation at yield point | Tensile elongation (%) | Tube moldability | Bellows moldability | |
| Example 1 | 63 | 27 | 10 | 0 | 144 | 161 | Good | 110 | Good | Good | Good |

TABLE 1-continued

| | Blending ratio | | | Top temperature of crystal melting curve within range of 130-155° C. | End temperature of crystal melting curve | Elongation at yield | Tensile elongation | Tube | Bellows | Resistance to repeated |
| | Poly(3-hydroxybutyrate)-based resin | | Aliphatic-aromatic polyester-based resin | | | | | | | |
| | X131A | 151C | Ecoflex C1200 | Ecoflex C2200 | (Tma)/° C. | (Tma)/° C. | point | (%) | moldability | moldability | bending |
|---|---|---|---|---|---|---|---|---|---|---|---|
| Example 2 | 36 | 54 | 10 | 0 | 143 | 165 | Good | 255 | Good | Good | Good |
| Example 3 | 56 | 24 | 20 | 0 | 143 | 162 | Good | 264 | Good | Good | Good |
| Example 4 | 32 | 48 | 20 | 0 | 144 | 166 | Good | 310 | Good | Good | Good |
| Example 5 | 49 | 21 | 30 | 0 | 144 | 161 | Good | 288 | Good | Good | Good |
| Example 6 | 28 | 42 | 30 | 0 | 143 | 165 | Good | 325 | Good | Good | Good |
| Example 7 | 63 | 27 | 0 | 10 | 142 | 162 | Good | 56 | Good | Good | Good |
| Example 8 | 56 | 24 | 0 | 20 | 143 | 164 | Good | 63 | Good | Good | Good |
| Example 9 | 49 | 21 | 0 | 30 | 144 | 163 | Good | 78 | Good | Good | Good |
| Comp. Example 1 | 100 | 0 | 0 | 0 | 144 | 151 | Bad | 3.6 | Good | Bad | Bad |
| Comp. Example 2 | 75 | 25 | 0 | 0 | 140 | 161 | Bad | 3.8 | Good | Bad | Bad |
| Comp. Example 3 | 50 | 50 | 0 | 0 | 139 | 165 | Good | 8.6 | Good | Bad | Good |

[Results]

A film formed from resin pellets containing poly(3-hydroxybutyrate-co-3-hydroxyhexanoate) and an aliphatic-aromatic polyester-based resin in each of Examples 1 through 9 was found to exhibit an elongation at yield point and a high tensile elongation. It was also found that, in a case where a resin tube was produced with use of the above resin pellets, it was possible to mold the resin tube well, the resin tube could be processed at room temperature to form bellows therein, and the resin tube was highly resistant to repeated bending. Therefore, the respective resin tubes in Examples 1 through 9 can be considered to be highly practical for use as a tube product such as a straw.

In contrast, a film formed from resin pellets containing no aliphatic-aromatic polyester-based resin in each of Comparative Examples 1 and 2 was found to exhibit neither an elongation at yield point nor a high tensile elongation. As such, although it was possible to form a tube, the tube had poor bellows moldability and poor resistance to repeated bending. Further, a film formed from resin pellets containing no aliphatic-aromatic polyester-based resin in Comparative Example 3 exhibited an elongation at yield point but had a low tensile elongation. As such, although the film had a good resistance to repeated bending, it was difficult to process the film at room temperature to form bellows therein.

INDUSTRIAL APPLICABILITY

The present tube can be processed at room temperature to form bellows therein and exhibits excellent resistance to repeated bending. As such, the present tube can be suitably used in various fields (for example, a straw and the like) in which a tube is needed.

The invention claimed is:

1. A method for producing a poly(3-hydroxybutyrate)-based resin tube, wherein the poly(3-hydroxybutyrate)-based resin tube comprises from 95 wt % to 60 wt % of a poly(3-hydroxybutyrate)-based resin; and from 5 wt % to 40 wt % of an aliphatic-aromatic polyester-based resin, wherein the poly(3-hydroxybutyrate)-based resin tube has an elongation at yield point in a tensile test and a tensile elongation of at least 50% in the tensile test, and the poly(3-hydroxybutyrate)-based resin tube has a thickness of 0.01 mm to 0.6 mm, wherein a crystal melting curve of a mixture of the poly(3-hydroxybutyrate)-based resin and the aliphatic-aromatic polyester-based resin in differential scanning calorimetry is such that a difference between a top temperature (Tma) of the crystal melting curve within a range of 130° C. to 155° C. and an end temperature (Tmb) of the crystal melting curve is at least 10° C., the method comprising:

processing the poly(3-hydroxybutyrate)-based resin tube at room temperature to form bellows therein.

2. The method for producing a poly (3-hydroxybutyrate)-based resin tube of claim 1, wherein:

the aliphatic-aromatic polyester-based resin comprises a repeating unit derived from an aliphatic dicarboxylic acid, a repeating unit derived from an aromatic dicarboxylic acid, and a repeating unit derived from a diol;

the aliphatic dicarboxylic acid is at least one selected from the group consisting of succinic acid, adipic acid, azelaic acid, sebacic acid, brassylic acid, pimelic acid, suberic acid, fumaric acid, and itaconic acid;

the aromatic dicarboxylic acid is at least one selected from the group consisting of terephthalic acid, isophthalic acid, and frandicarboxylic acid; and the diol is at least one selected from the group consisting of 1,2-ethanediol, 1,3-propanediol, and 1,4-butanediol.

3. The method for producing a poly (3-hydroxybutyrate)-based resin tube of claim 1, wherein the poly(3-hydroxybutyrate)-based resin is poly(3-hydroxybutyrate-co-3-hydroxyhexanoate).

4. The method for producing a poly (3-hydroxybutyrate)-based resin tube of claim 1, further comprising:

melting a mixture of the poly(3-hydroxybutyrate)-based resin and the aliphatic-aromatic polyester-based resin in an extruder; and extruding the mixture through an annular die into water, wherein the annular die has a temperature set between a top temperature (Tma) of a crystal melting curve in differential scanning calorimetry of the mixture and an end temperature (Tmb) of the crystal melting curve.

5. The method for producing a poly (3-hydroxy butyrate)-based resin tube of claim 1, wherein the top temperature (Tma) of the crystal melting curve is from 140° C. to 145° C., and the end temperature (Tmb) of the crystal melting curve is from 165° C. to 175° C.

\* \* \* \* \*